United States Patent [19]

Weinert

[11] 4,236,377
[45] Dec. 2, 1980

[54] HEAT EXPANSION MACHINE

[76] Inventor: Friedrich Weinert, 219-19 131st Ave., Jamaica, N.Y. 11413

[21] Appl. No.: 893,047

[22] Filed: Apr. 3, 1978

[51] Int. Cl.³ .............................................. F03G 7/02
[52] U.S. Cl. ........................................ 60/641; 60/527
[58] Field of Search ......................... 60/516, 527–531, 60/641, 721

[56] References Cited

U.S. PATENT DOCUMENTS 2,878,641  3/1959  Decker ................................... 60/527

FOREIGN PATENT DOCUMENTS 1540330  2/1979  United Kingdom ....................... 60/529

Primary Examiner—Allen M. Ostrager
Assistant Examiner—Stephen F. Husar
Attorney, Agent, or Firm—Jordan and Hamburg

[57] ABSTRACT

A gravity motor utilizes a heat expansion mechanism comprising a frame, a rotational shaft supported by the frame, a drive gear connected to the rotational shaft, the drive gear having a plurality of teeth around the outer periphery thereof, a plurality of drive bars, the drive bars at one end thereof being pivotally secured to the drive gear around the circumference of the drive gear to permit pivoting of the drive bars within a predetermined range limited by two teeth of the drive gear and the other end of each of the drive bars extending radially outwardly therefrom, and a plurality of expansion means, at least one expansion means being respectively situated between the drive bars to change the distance between the drive bars, whereby when one or more expansion means is actuated continuously on one side of the motor by heating or cooling the expansion means, the motor becomes successively unbalanced between the two sides to thereby move continuously.

The machine has been designed to use solar energy to drive a wheel with a minimum loss of energy. It may also be activated by electric or nuclear energy in the simplest and most practical form. It is a slow motion stationary machine and therefore long lasting requiring very little maintenance.

4 Claims, 16 Drawing Figures

HEAT EXPANSION MACHINE

FUNCTIONING

Figure 1B:
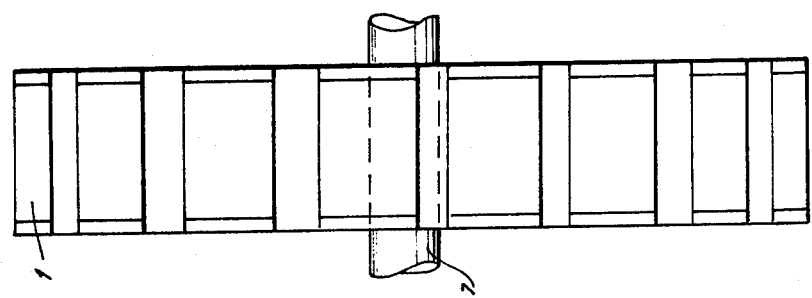
FIG. 1B is a side view of the heat expansion machine shown in FIG. 1A.
Figure 1A:
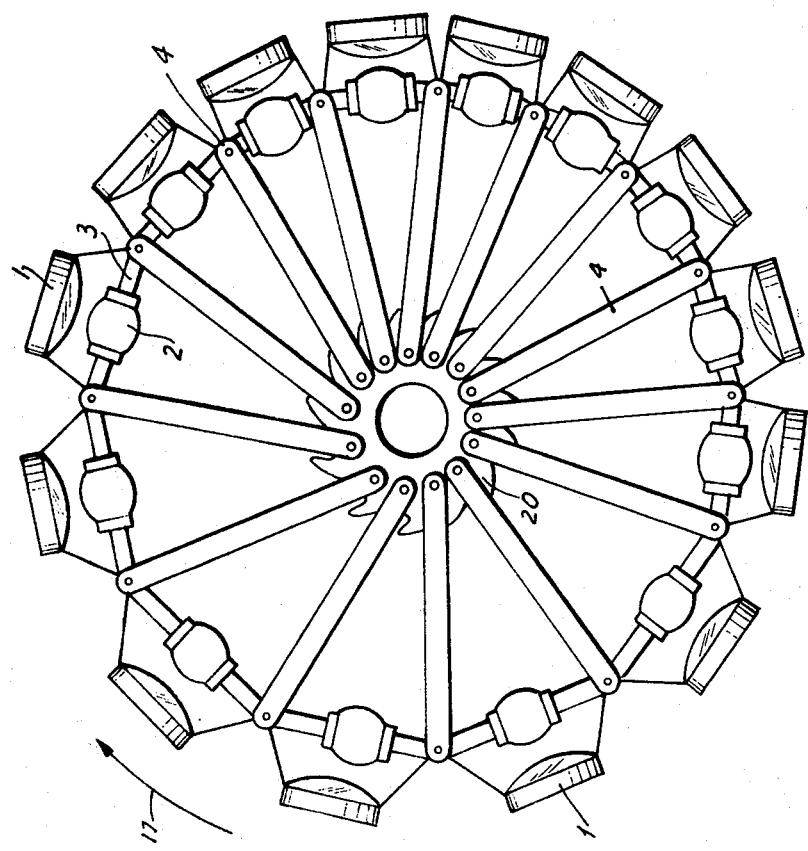
FIG. 1A is a plan view of the heat expansion machine.
Figures 8, 10:
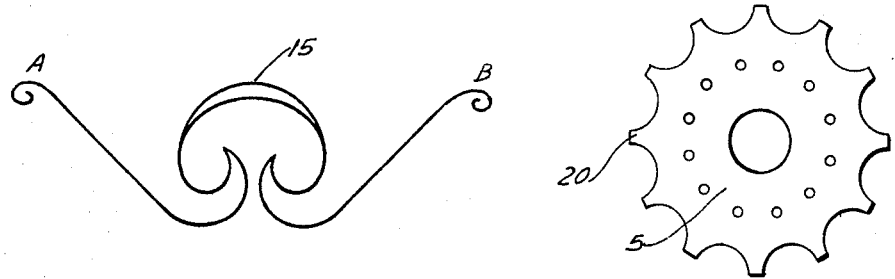
FIG. 8 is a plan view of the heat expansion spring used in FIG. 2A in its thermally expanded state.
FIG. 10 is a plan view of the gear wheel which serves as the hub of the heat expansion machine.
Figure 11:
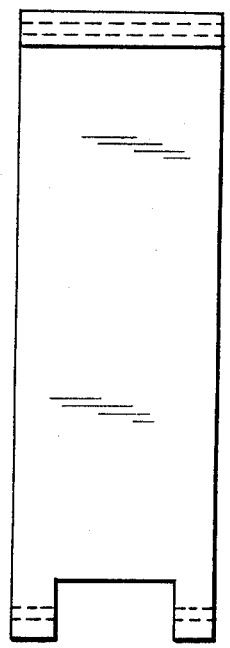
FIG. 11 is a plan view of the drive bar which is pivotably mounted to the gear wheel shown in FIG. 10.
Figure 12:
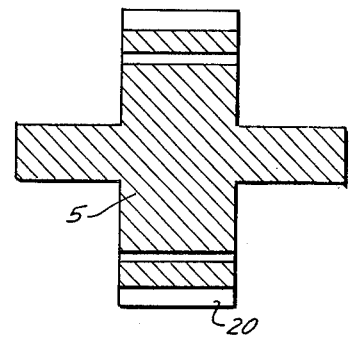
FIG. 12 is a vertical sectional view of the gear wheel shown in FIG. 10.

The invention covers the principal idea and design of a one gear wheel FIG. 10 (5), which has several drive bars, FIG. 1 (4) symmetrically installed in such a way, that each drive bar fits mobile between two teeth, FIG. 10 (20). When the gear FIG. 10 (10) starts to turn the drive bars will be lifted by the next following tooth in driving direction.

Between each pair of drive bars are installed one or more heat expansion valves. FIG. 1 (2) and FIG. 3 (8). The expansion valves line up the drive bars symmetrically when not in motion. The drive movement is created when one or more expansion valves start to expand. When one expansion valve expands it increases the space between two drive bars and moves automatically the rest of the bars together. Therefore the wheel gets out of balance and creates a drive impulse.

The larger the center wheel, the more and longer bars can be installed. This increases the weight and thereby the mechanical power. For constant drive the expansion valve must be timed in such a way, that the distance between the bars becomes larger on one side and smaller on the other.

EXPANSION VALVES

Figure 2B:
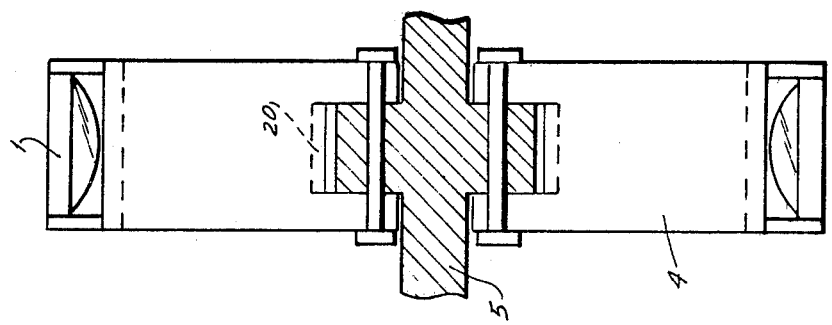
FIG. 2B is a schematic vertical sectional view of the expansion machine of FIG. 2A.
Figure 2A:
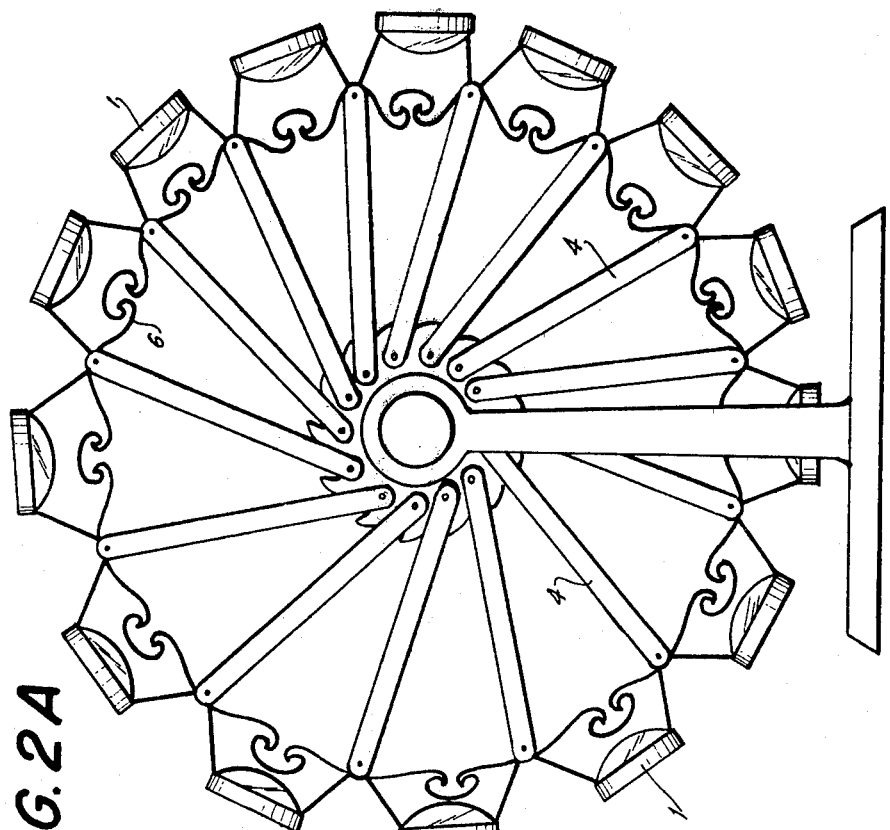
FIG. 2A is a plan view of another embodiment of the heat expansion machine.
Figure 5:
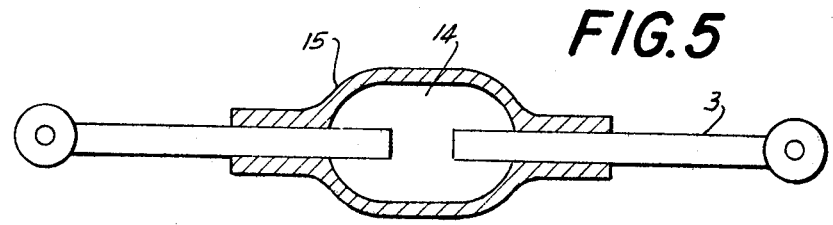
FIG. 5 is a schematic vertical sectional view of the heat expansion valve used in FIG. 1A in its initial contracted state.
Figure 6:
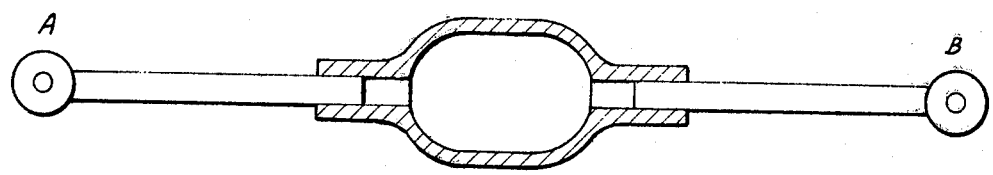
FIG. 6 is a schematic vertical sectional view of the heat expansion valve used in FIG. 1A in its thermally expanded state.

The expansion valves FIG. 1 (2) and FIG. 2 (6) are designed to act in response to heat rays, see details in FIGS. 5 and 6.

The expansion valve consists of one cylinder, one or two push rods and one heat chamber. The heat chamber is filled with expandable liquid as for instance Mercury.

When the heat rays hit the top of the cylinder, FIG. 5 (15) the liquid will expand and move by hydraulic power the two push rods side ways.

Once the valve cools, the push rods will move back to first position.

Figures 7, 9:
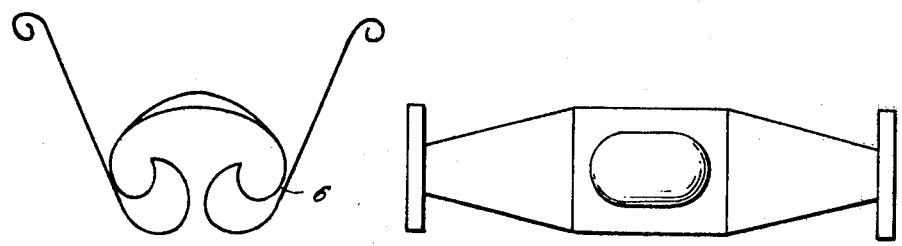
FIG. 7 is a plan view of the heat expansion spring used in FIG. 2A in its contracted state.
FIG. 9 is a top plan view of the heat expansion valve shown in FIGS. 5 and 6.

EXPANSION SPRING: FIGS. 7 and 8

The expansion spring is made of a flat piece of metal bent into curves as shown in FIGS. 7 and 8 in such a way that on top of the spring a hollow cup is built, called a heat shield. This cup creates tension in the spring which can be relieved by heat. The spring will open on application of heat on the heat shield and expand the distance between A and B. See FIG. 8. Once heat is cut off the spring shrinks back to its former position.

Figure 4:
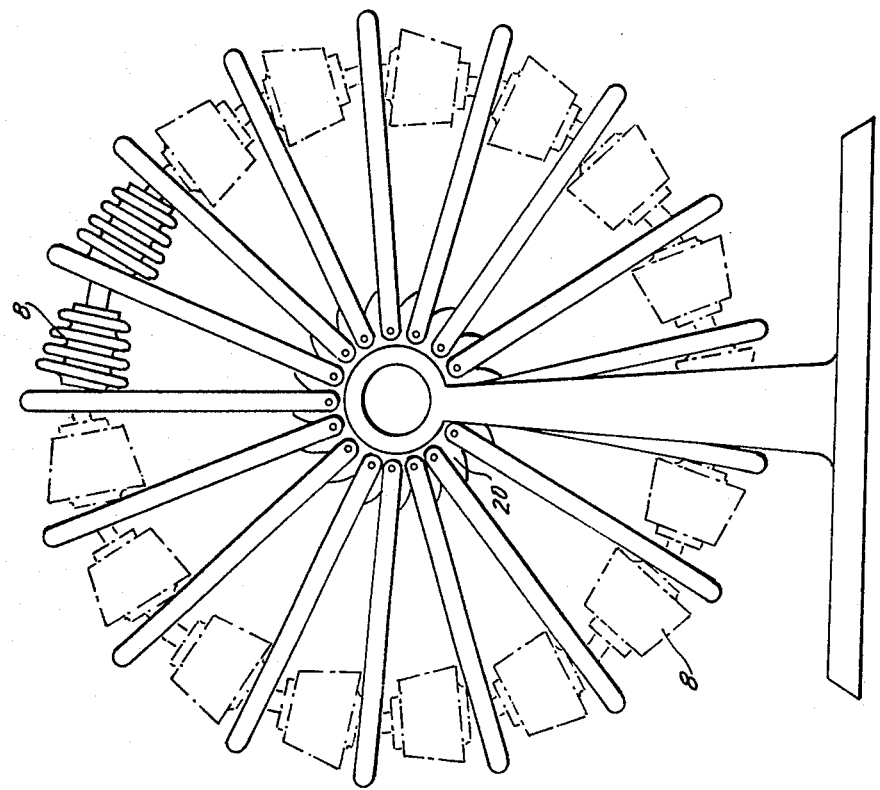
FIG. 4 is a plane view, with details partially shown in dotted lines, of the heat expansion machine of FIG. 3 mounted on a support stand.
Figure 3:
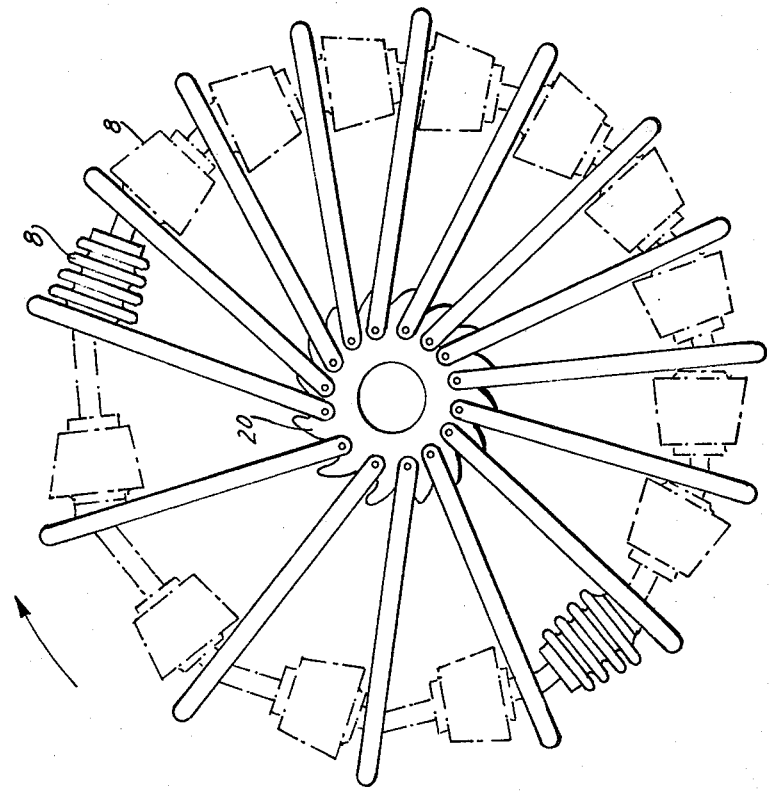
FIG. 3 is a plan view, with details partially shown in dotted lines, of another embodiment of the heat expansion machine.
Figure 13:
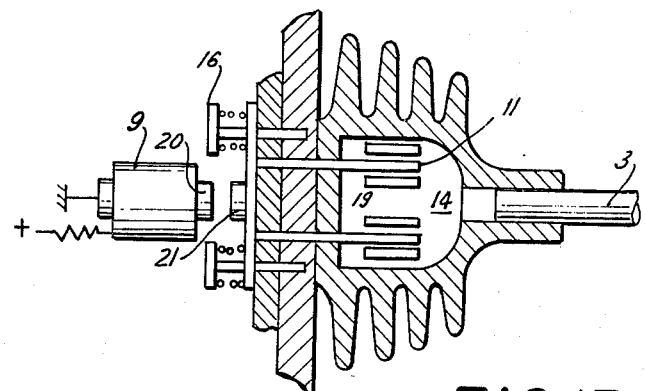
FIG. 13 is a schematic vertical sectional view of the expansion valve used in FIGS. 3 and 4 in which the internal heat source is in the unactivated position.
Figure 14:
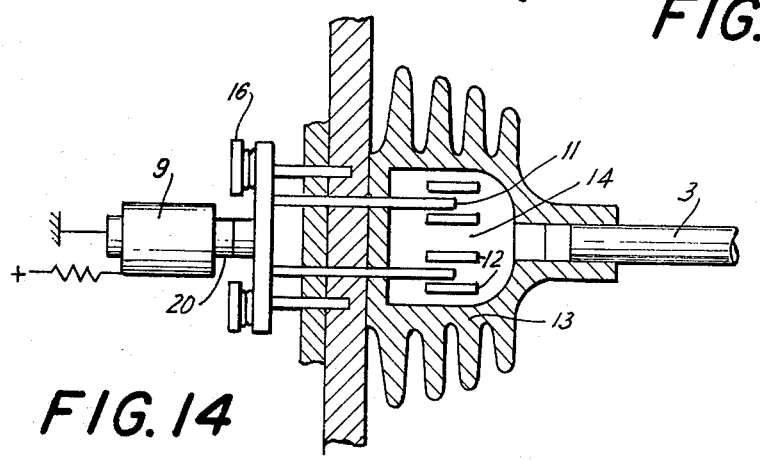
FIG. 14 is a schematic vertical sectional view of the expansion valve used in FIGS. 3 and 4 in which the internal heat source is in the activated position.

Expansion valve 8 FIGS. 3 and 4 is similar to expansion valve 2 and 6 except that the heat will be created by electric heat elements which are installed in the center of the expansion valve chamber FIG. 13 (19). This will be a faster reaction toward expanding and shrinking the liquid in the cylinder.

The expansion valve can be activated also by nuclear reaction as demonstrated in FIG. 13 (3 and 4).

The advantage herein is that very little energy is used in a very short time. Therefore no sophisticated cooling system is needed and thermal energy is directly converted into mechanical power.

Perfect timing is needed as shown in FIG. 13. One magnet (9) will pull by contact the cadmium stick (11) out of the reactor element (12) and release the automatic cut off valve (21). For safety reasons, the cut off valve is activated by spring pressure as shown. The cut off valve is shown in closed position in FIG. 13 (10 and 16).

I claim:

1. A gravity motor utilizing a heat expansion mechanism comprising a frame, a rotational shaft supported by the frame, a drive gear connected to said rotational shaft, said drive gear having a plurality of teeth around the outer periphery thereof, a plurality of drive bars, the drive bars at one end thereof being pivotally secured to the drive gear around the circumference of the drive gear to permit pivoting of the drive bars within a predetermined range limited by two teeth of the drive gear and the other end of each of the drive bars extending radially outwardly therefrom, and a plurality of expansion means, at least one expansion means being respectively situated between the drive bars to change the distance between the drive bars, whereby when one or more expansion means is actuated continuously on one side of the motor by heating or cooling the expansion means, the motor becomes successively unbalanced between the two sides to thereby move continuously.

2. A gravity motor as claimed in claim 1, further comprising means for focusing sunlight onto each expansion means, whereby each expansion means is heatable by sunlight.

3. A gravity motor as claimed in claim 1 or 2, in which each expansion means includes two symmetrically situated rods, said rods being connected to the adjacent two drive bars.

4. A gravity motor as claimed in claim 1, in which said expansion means comprises a curved spring including a hollow cup, said spring being connected to the adjacent drive bars, so that when the hollow cup is heated, the spring expands to thereby increase the distance between the drive bars.

* * * * *